United States Patent [19]

Yoshimoto et al.

[11] Patent Number: 5,011,674

[45] Date of Patent: Apr. 30, 1991

[54] METHOD OF PRODUCING TITANIUM OXIDES

[75] Inventors: Masafumi Yoshimoto, Sakai; Tadao Nakatsuji, Kashibacho; Kazuhiko Nagano, Sakai, all of Japan

[73] Assignee: Sakai Chemical Industry Co., Ltd., Osaka, Japan

[21] Appl. No.: 438,001

[22] Filed: Nov. 20, 1989

Related U.S. Application Data

[62] Division of Ser. No. 357,599, May 26, 1989.

[30] Foreign Application Priority Data

May 28, 1988 [JP] Japan .............................. 63-131076

[51] Int. Cl.$^5$ ........................................... C01G 23/047
[52] U.S. Cl. ..................................... 423/610; 423/84; 423/608; 423/612
[58] Field of Search .................... 423/608, 82, 84, 612, 423/610, 609, 615, 616

[56] References Cited

U.S. PATENT DOCUMENTS

| | | | |
|---|---|---|---|
| 1,223,356 | 4/1917 | Barton | 423/612 |
| 3,442,678 | 5/1969 | Ross | 423/612 |
| 3,929,962 | 12/1975 | Shiah | 423/82 |
| 4,021,533 | 5/1977 | Piccolo et al. | 423/612 |
| 4,061,596 | 12/1977 | Matsushita et al. | 502/439 |
| 4,069,295 | 1/1978 | Sugahara et al. | 423/84 |
| 4,359,449 | 11/1982 | Hard et al. | 423/84 |

FOREIGN PATENT DOCUMENTS 481892 of 1938 United Kingdom ............... 423/612

Primary Examiner—Theodore Morris
Assistant Examiner—Edward Squillante
Attorney, Agent, or Firm—Wenderoth, Lind & Ponack

[57] ABSTRACT

There is provided a method of producing titanium-oxides which comprises: admixing an aqueous solution of titanium tetrachloride with sulfuric acid in amounts of at least 0.5 times is moles as the titanium tetrachloride; adding an alkali to the resultant solution to produce titanium hydroxide; and drying and calcining the titanium hydroxide. A further method is provided which comprises: adding a solution of an alkali to an aqueous solution of titanium tetrachloride having a concentration of not more than 2.5 moles/l at temperatures of not less than 50° C., thereby to substantially thermally hydrolyze the titanium tetrachloride and to produce titanium hydroxide; and drying and calcining the titanium hydroxide.

4 Claims, No Drawings

METHOD OF PRODUCING TITANIUM OXIDES

This is a division of Ser. No. 07/357,599 filed May 26, 1989.

This invention relates to a method of producing titanium oxides using titanium tetrachloride as a raw material, and more particularly, to a method of producing titanium oxides which have a large specific surface area, high heat resistance and high mechanical strength after molding, and hence are suitably used as a catalyst carrier material or a molded catalyst.

Calcined titanium oxides have found an important application is a molded honeycomb structure which is used as a catalyst carrier material or a catalyst material itself. It is known that the specific surface area, crystal form, heat resistance and mechanical strength after molding of titanium oxides have an essential influence on performance or quality of the resultant carrier or catalyst material. However, there has been known no method which provides titanium oxides which have a large specific surface area, high heat resistance and high mechanical strength after molding as above mentioned.

For instance, a method is known in which titanium tetrachloride is neutralized and decomposed by addition of an alkali thereto, and the resultant titanium hydroxide is calcined to provide titanium oxides. However, this method fails to provide titanium oxides desired as above.

A method is also known in which a large amount of finely divided silicic acid is added to titanium tetrachloride, and then neutralized and decomposed. In a further method, a solution of oxides of metals such as of aluminum, tin or zirconium is added to a solution of titanium tetrachloride, and then neutralized, thereby to coprecipitate titanium together with the metal. These methods provide titanium oxides improved in heat resistance or mechanical strength after molding to a degree, however, as apparent, the resultant titanium oxides contain a large amount of components other than titanium oxides, so that they are not suitable for use as a catalyst carrier or a catalyst material. High purity titanium oxides are needed to produce a titanium oxide based carrier or catalyst material.

It is, therefore, an object of the invention to obviate the above mentioned problems involved in the production of titanium oxides using titanium tetrachloride as a raw material, and to provide a method of producing titanium oxides which have a large specific surface area, high heat resistance and high mechanical strength after molding, and hence are suitably used as a catalyst carrier material or a molded catalyst itself, without co-use of metal oxides and titanium tetrachloride and without use of coprecipitates of the metals with titanium.

A first method of producing titanium oxides according to the invention comprises: admixing an aqueous solution of titanium tetrachloride with sulfuric acid in amounts of at least 0.5 times in moles as the titanium tetrachloride; adding an alklai to the resultant solution to produce titanium hydroxide; and drying and calcining the titanium hydroxide.

There is further provided a second method of producing titanium oxides in accordance with the invention, which comprises: adding a solution of an alkali to an aqueous solution of titanium tetrachloride having a concentration of not more than 2.5 moles/l at temperatures of not less than 50° C., thereby to substantially thermally hydrolyze the titanium tetrachloride and to produce titanium hydroxide, and drying and calcining the titanium hydroxide.

The first method will now be fully described, in which at first an aqueous solution of titanium tetrachloride is mixed with sulfuric acid in amounts of at least 0.5 times in moles, preferably in the same amount in moles, as the titanium tetrachloride, and the mixture is fully stirred. When the amount of sulfuric acid added to the aqueous solution of titanium tetrachloride is less than 0.5 times in moles as the titanium tetrachloride, the calcination of the resultant titanium hydroxide fails to provide titanium oxides as desired.

The solution of titanium tetrachloride mixed with sulfuric acid may be stirred at room temperatures, but it is preferred that the solution is stirred at temperatures of about 50°–100° C., for instance at about 70° C., for a sufficient period of time, to remove the hydrogen chloride generated in the reaction of titanium tetrachloride with sulfuric acid, so that the amount of an alkali needed in the following neutralization step may be reduced.

Further, it is preferred that the solution is diluted with, preferably water, prior to the addition of an alkali thereto so that it has not a high viscosity, but it is readily stirred after the addition of an alkali thereto. The solution may be diluted preferably to a concentration of not more than about 0.65 moles/l as titanium tetrachloride, although not limited thereto.

Then, an aqueous solution of an alkali is added to the solution of titanium tetrachloride mixed with sulfuric acid intermittently or continuously over a period of time, thereby to neutralize and decompose the titanium tetrachloride to produce titanium hydroxide. The reaction temperature is not specifically limited, however, the reaction is preferably carried out at temperatures between about 70° C. and boiling temperatures of the mixture to obtain good results.

The manner of addition of an aqueous alkali solution to the solution of titanium tetrachloride mixed with sulfuric acid and diluted is also not specifically limited, but the aqueous alkali solution is usually added to the titanium tetrachloride solution over about half an hour until the pH of the mixture becomes 7.0.

By way of example, when a 0.65 moles/l solution of titanium tetrachloride has been mixed with an aqueous solution of sulfuric acid in amounts of 0.5 times in moles as the titanium tetrachloride, an alkaline solution is added to the titanium tetrachloride solution mixed with sulfuric acid at a rate of about 0.14 moles per minute per mole of titanium tetrachloride, thereby to put the pH of the mixture to 7.0 in about 30 minutes.

There may be preferably used as an alkali solution, for example, ammonia water, but an aqueous solution of alkali metal hydroxides such as sodium hydroxide or potassium hydroxide may also be used.

The resultant titanium hydroxide is separated from the mixture by, for example, filtration, heated and dried at, for example, about 100° C., and then calcined at about 300°–700° C., to provide titanium oxides as desired. The calcination may be carried out under any atmosphere either under air, or a combustible or inactive atmosphere.

Turning to the second method of the invention, in which an aqueous alkaline solution is added dropwise to a heated aqueous solution of titanium tetrachloride, to thermally hydrolyze the titanium tetrachloride and produce titanium hydroxide, and the titanium hydroxide is dried and calcined, to provide titanium oxides as desired.

In this second method of the invention, it is essentially important to properly control reaction temperatures and addition rates of an alkaline solution to a titanium tetrachloride solution depending upon the concentrations of the titanium tetrachloride solution used so that the thermal hydrolysis of the titanium tetrachloride is promptly initiated and proceeds smoothly, to provide titanium hydroxide, which in turn provides titanium oxides of a large specific surface area, high heat resistance and mechanical strength after molding.

In the thermal hydrolysis of titanium tetrachloride in solutions, when the solution is of a small concentration, the reaction temperature may be low, and in accordance therewith the addition rate of an alkaline solution may be small, whereas when the solution is of a high concentration, the reaction temperature must be high, and in accordance therewith the addition rate of an alkaline solution must be large.

Therefore, for example, when the reaction is carried out at temperatures of about 50°-70° C., the concentration of titanium tetrachloride is preferably of not more than about 0.8 moles/l and the addition rate of an alkaline solution is preferably of not more than about 0.05 moles/l per mole of titanium tetrachloride so that the titanium tetrachloride is substantially thermally hydrolyzed. When the reaction is carried out at temperatures of about 70°-80° C., the concentration of titanium tetrachloride is preferably of not more than about 1.2 moles/l and the addition rate of an alkaline solution is preferably of not more than about 0.05 moles/l per mole of the titanium tetrachloride, and when the reaction is carried out at temperatures of about 80°-90° C., the concentration of titanium tetrachloride is preferably of not more than about 1.6 moles/l and the addition rate of an alkaline solution is preferably of not more than about 0.05 moles/l per mole of the titanium tetrachloride. When the reaction is carried out at temperatures near boiling points of the reaction mixture, the concentration of titanium tetrachloride is preferably of not more than about 2.5 moles/l and the addition rate of an alkaline solution is preferably of not more than about 0.10 moles/l per mole of the titanium tetrachloride.

In the second method also, ammonia water is preferably used as an alkali solution, but an aqueous solution of alkali metal hydroxides such as sodium hydroxide or potassium hydroxide may also be used.

When the reaction temperature, and the concentration of titanium chloride solutions and the addition rate of the alkaline solution thereto determined depending thereupon are outside the above specified, the thermal hydrolysis of the titanium tetrachloride is rarely takes place. Further, as a general tendency, the calcination of the resultant titanium hydroxide, if produced, fails to provide titanium oxides which have a large specific surface area, high heat resistance and high mechanical strength after molding.

In the second method, when the aqueous titanium tetrachloride solution is heated to specific temperatures as before described depending upon the concentrations thereof, the solution becomes turbid around the temperatures since the thermal hydrolysis of titanium tetrachloride is initiated. According to the invention, an aqueous solution of titanium tetrachloride is heated to specific temperatures depending upon the concentrations thereof, and an alkaline solution is gradually added to the solution at specific rates as before described, thereby to promptly carry out the thermal hydrolysis of titanium tetrachloride. Moreover, the calcination of the titanium hydroxide produced in this manner provides titanium oxides as desired. When an alkali solution is not added to a titanium tetrachloride solution, the thermal hydrolysis of titanium tetrachloride proceeds only at very small rates, and further, the calcination of the resultant titanium hydroxide does not provide titanium oxides as desired.

When an aqueous solution of titanium tetrachloride is heated to specific temperatures depending upon the concentrations thereof, and an alkali solution is gradually added to the solution at specific rates as described hereinbefore, the pH of the reaction mixture becomes smaller, and returns to the initial value through a minimum after some time, and then rather rapidly raises to 7.0. The time for the pH of the reaction mixture to become 7.0 is usually about one hour when an alkaline solution is added to a titanium tetrachloride solution at a maximum rate as before described. The smaller the addition rate, the longer the above mentioned time.

The change in the pH of the reaction mixture is specifically observed when the concentrations of titanium tetrachloride solutions, reaction temperatures and addition rates of alkaline solution are selected as before described. In accordance with the method of the invention, it is likely that titanium tetrachloride is not neutralized and decomposed, but is thermally hydrolyzed, irrespectively of the addition of an alkali to a titanium tetrachloride solution since when the thermal hydrolysis of titanium tetrachloride is initiated. The hydrogen chloride generated in the thermal hydrolysis is almost at once neutralized with an alkali added to the reaction mixture, although the invention is not limited to any theory. Accordingly, when an alkaline solution is added to a titanium tetrachloride solution too slowly, the neutralization and decomposition of the titanium tetrachloride takes place predominantly, and thus the resultant titanium hydroxide fails to provide titanium oxides as desired.

The invention will now be described with reference to examples, however, the invention is not limited thereto. The examples 1-10 are directed to the first method, and the examples 11-28 are directed to the second method.

In all the examples and reference examples, titanium hydroxide was prepared, filtered, washed, dried at 100° C. for 12 hours, calcined at 500° C. or 600° C. for three hours to provide titanium dioxide, cooled, pulverized with a sample mill, and screened. Therefore, the production of titanium hydroxide only was described in all the examples and reference examples.

EXAMPLE 1

An amount of 31 kg of a 98% sulfuric acid was added to 177 kg of a 67.3% by weight aqueous solution of titanium tetrachloride (50 kg as $TiO_2$) to put the ratio of sulfuric acid/$TiCl_4$ to 0.5. The resultant solution of titanium tetrachloride mixed with sulfuric acid was heated to about 70° C. under stirring and the stirring was continued at the temperature for one hour. Then water was added to the solution to a volume of 1 $m^3$.

The diluted solution was again heated to about 70° C., and then ammonia water was added dropwise thereto at a rate of 67 moles per minute until the solution had a pH of 7.0 over 30 minutes, to precipitate titanium hydroxide.

EXAMPLE 2

The molar ratio of sulfuric acid/TiCl$_4$ was put to 1.0, and otherwise in the same manner as in Example 1, titanium hydroxide was prepared.

EXAMPLE 3

The molar ratio of sulfuric acid/TiCl$_4$ was put to 3.0, and otherwise in the same manner as in Example 1, titanium hydroxide was prepared.

REFERENCE EXAMPLE 1

An amount of 16 kg of a 98% sulfuric acid was added to 177 kg of a 67.3% by weight aqueous solution of titanium tetrachloride (50 kg as TiO$_2$) to put the ratio of sulfuric acid/TiCl$_4$ to 0.25. The resultant solution was heated to about 70° C. under stirring and then further stirred at 70° C. for one hour. Then water was added to the solution to a volume of 1 m$^3$.

Ammonia water was added dropwise to the solution at normal temperatures for 30 minutes to put the pH of the solution to 7.0.

EXAMPLE 4

The molar ratio of sulfuric acid/TiCl$_4$ was put to 0.5, and otherwise in the same manner as in Reference Example 1, titanium hydroxide was prepared.

EXAMPLE 5

The molar ratio of sulfuric acid/TiCl$_4$ was put to 1.0, and otherwise in the same manner as in Reference Example 1, titanium hydroxide was prepared.

EXAMPLE 6

The molar ratio of sulfuric acid/TiCl$_4$ was put to 2.0, and otherwise in the same manner as in Reference Example 1, titanium hydroxide was prepared.

EXAMPLE 7

The molar ratio of sulfuric acid/TiCl$_4$ was put to 3.0, and otherwise in the same manner as in Reference Example 1, titanium hydroxide was prepared.

EXAMPLE 8

An amount of 31 kg of a 98% sulfuric acid was added to 177 kg of a 67.3% by weight aqueous solution of titanium tetrachloride to put the molar ratio of sulfuric acid/TiCl$_4$ to 0.5. The resultant solution was stirred at normal temperatures for one hour, and then diluted with water to a volume of 1 m$^3$.

Ammonia water was then added dropwise to the solution at normal temperatures for 30 minutes to put the pH of the solution to 7.0, to precipitate titanium hydroxide.

EXAMPLE 9

The molar ratio of sulfuric acid/TiCl$_4$ was put to 1.0, and otherwise in the same manner as in Example 8, titanium hydroxide was prepared.

EXAMPLE 10

The molar ratio of sulfuric acid/TiCl$_4$ was put to 3.0, and otherwise in the same manner as in Example 8, titanium hydroxide was prepared.

EXAMPLE 11

Water was added to an amount of 177 kg of a 67.3% by weight aqueous solution of titanium tetrachloride to prepare a 0.63 moles/l solution of titanium tetrachloride in a volume of 1 m$^3$. The solution was heated to about 70° C. under stirring. Immediately before the solution reached 70° C., the solution became slightly turbid.

A 25% industrial use ammonia water was then added dropwise at a rate of 6.5 l per minute to the solution at 70° C. over 60 minutes to put the pH of the solution to 7.0, to precipitate titanium hydroxide.

EXAMPLE 12

The ammonia water was added dropwise at a rate of 13 l per minute over about 30 minutes, and otherwise in the same manner as in Example 11, titanium hydroxide was prepared.

EXAMPLE 13

The ammonia water was added dropwise at a rate of 4.3 l per minute over about 90 minutes, and otherwise in the same manner as in Example 11, titanium hydroxide was prepared.

EXAMPLE 14

The ammonia water was added dropwise at a rate of 3.3 l per minute over about 120 minutes, and otherwise in the same manner as in Example 11, titanium hydroxide was prepared.

EXAMPLE 15

Water was added to an amount of 177 kg of a 67.3% by weight aqueous solution of titanium tetrachloride to a volume of 500 l, and otherwise in the same manner as in Example 11, titanium hydroxide was prepared.

EXAMPLE 16

Water was added to an amount of 177 kg of a 67.3% by weight aqueous solution of titanium tetrachloride to prepare to 1 m$^3$ of a 0.63 moles/l solution of titanium tetrachloride.

The solution was heated to about 50° C. under stirring. Then, while the solution was maintained at about 50° C., a 25% industrial use ammonia water was added thereto dropwise at a rate of 6.5 l per minute over 60 minutes to put the pH of the solution to 7.0, to precipitate titanium hydroxide.

EXAMPLE 17

The ammonia water was added dropwise at a rate of 3.3 l per minute over about 120 minutes, and otherwise in the same manner as in Example 16, titanium hydroxide was prepared.

EXAMPLE 18

Water was added to an amount of 177 kg of a 67.3% by weight aqueous solution of titanium tetrachloride to prepare 630 l of a 0.63 moles/l solution of titanium tetrachloride.

The solution was heated to about 50° C. under stirring, and while the solution was maintained at about 50° C., a 25% industrial use ammonia water was added thereto dropwise at a rate of 6.5 l per minute over 60 minutes to put the pH of the solution to 7.0, to precipitate titanium hydroxide.

EXAMPLE 19

Water was added to an amount of 177 kg of a 67.3% by weight aqueous solution of titanium tetrachloride to prepare 1 m$^3$ of a 0.63 moles/l solution of titanium tetrachloride.

The solution was heated to about 90° C. under stirring. And while the solution was maintained at about 90° C., a 25% industrial use ammonia water was added thereto dropwise at a rate of 6.5 l per minute over 60 minutes to put the pH of the solution to 7.0, to precipitate titanium hydroxide.

EXAMPLE 20

The ammonia water was added dropwise at a rate of 13 l per minute over about 30 minutes, and otherwise in the same manner as in Example 19, titanium hydroxide was prepared.

EXAMPLE 21

The ammonia water was added dropwise at a rate of 3.3 l per minute over about 120 minutes, and otherwise in the same manner as in Example 19, titanium hydroxide was prepared.

EXAMPLE 22

Water was added to an amount of 177 kg of a 67.3% by weight aqueous solution of titanium tetrachloride to prepare 500 l of a 1.25 moles/l solution of titanium tetrachloride.

The solution was heated to about 90° C. under stirring. Then while the solution was maintained at about 90° C., a 25% industrial use ammonia water was added thereto dropwise at a rate of 6.5 l per minute over 60 minutes to put the pH of the solution to 7.0, to precipitate titanium hydroxide.

EXAMPLE 23

Water was added to an amount of 177 kg of a 67.3% by weight aqueous solution of titanium tetrachloride to prepare 400 l of a 1.57 moles/l solution of titanium tetrachloride.

The solution was heated to about 90° C. under stirring. While the solution was maintained at about 90° C., a 25% industrial use ammonia water was added thereto dropwise at a rate of 6.5 l per minute over 60 minutes to put the pH of the solution to 7.0, to precipitate titanium hydroxide.

EXAMPLE 24

Water was added to an amount of 177 kg of a 67.3% by weight aqueous solution of titanium tetrachloride to a volume of 1 m$^3$, to prepare a 0.63 moles/l solution of titanium tetrachloride.

The solution was heated near to a boiling point (98°-100° C.) under stirring. While the solution was maintained at the above temperature, a 25% industrial use ammonia water was added thereto dropwise at a rate of 6.5 l per minute over 60 minutes to put the pH of the solution to 7.0, to precipitate titanium hydroxide.

EXAMPLE 25

The ammonia water was added dropwise at a rate of 13 l per minute over about 30 minutes, and otherwise in the same manner as in Example 24, titanium hydroxide was prepared.

EXAMPLE 26

The ammonia water was added dropwise at a rate of 3.3 l per minute over about 120 minutes, and otherwise in the same manner as in Example 24, titanium hydroxide was prepared.

EXAMPLE 27

Water was added to an amount of 177 kg of a 67.3% by weight aqueous solution of titanium tetrachloride to prepare 300 l of a 2.09 moles/l solution of titanium tetrachloride.

The solution was heated near to a boiling point (98°-100° C.) under stirring. While the solution was maintained at the above temperature, a 25% industrial use ammonia water was added thereto dropwise at a rate of 6.5 l per minute over 60 minutes to put the pH of the solution to 7.0, to precipitate titanium hydroxide.

EXAMPLE 28

Water was added to an amount of 177 kg of a 67.3% by weight aqueous solution of titanium tetrachloride to prepare 250 l of a 2.5 moles/l solution of titanium tetrachloride.

The solution was heated near to a boiling point (98°-100° C.) under stirring. While the solution was maintained at the above temperature, a 25% industrial use ammonia water was added thereto dropwise at a rate of 6.5 l per minute over 60 minutes to put the pH of the solution to 7.0, to precipitate titanium hydroxide.

REFERENCE EXAMPLE 2

Water was added to an amount of 177 kg of a 67.3% by weight aqueous solution of titanium tetrachloride to prepare 1 m$^3$ of a 0.63 moles/l solution of titanium tetrachloride.

The solution was heated near to a boiling point (98°-100° C.) under stirring, and further stirred at the above temperature for three hours, to produce titanium hydroxide. The decomposition rate of titanium tetrachloride was found 52%.

REFERENCE EXAMPLE 3

Water was added to an amount of 177 kg of a 67.3% by weight aqueous solution of titanium tetrachloride to prepare 1 m$^3$ of a 0.63 moles/l solution of titanium tetrachloride.

A 25% industrial use ammonia water was added at normal temperatures to the solution dropwise at a rate of 6.5 l per minute over 60 minutes to put the pH of the solution to 7.0, to precipitate titanium hydroxide.

REFERENCE EXAMPLE 4

The ammonia water was added dropwise at a rate of 13 l per minute over about 30 minutes, and otherwise in the same manner as in Reference Example 2, titanium hydroxide was prepared.

REFERENCE EXAMPLE 5

The ammonia water was added dropwise at a rate of 3.3 l per minute over about 120 minutes, and otherwise in the same manner as in Reference Example 2, titanium hydroxide was prepared.

REFERENCE EXAMPLE 6

An amount of 5.6 kg as SiO$_2$ of finely divided amorphous silica of average particle size of 0.1 μm was added to an amount of 177 kg of a 67.3% by weight aqueous solution of titanium tetrachloride. Ammonia water was then added to the mixture over about 30 minutes to put the pH of the mixture to 7.0, to precipitate titanium hydroxide containing the silica.

REFERENCE EXAMPLE 7

Titanium sulfate was thermally hydrolyzed at about 107° C., and the resultant metatitanic acid was filtered, washed with water, dried at 100° C. for 12 hours, and calcined to provide titanium dioxide.

The titanium dioxide produced in the foregoing Examples and Reference Examples were subjected to measurements of specific surface area with an automatic specific surface area measuring apparatus (Micromeritics, Model 2200-01).

Further, an amount of 10 kg of the titanium dioxide produced by calcining titanium hydroxide or metatitanic acid at a temperature of 500° C. in the foregoing Examples and Reference Examples was mixed with 2.5 l of a 10% methyl amine solution containing 70 g of ammonium paratungstate, and the mixture was kneaded. The mixture was then extruded into a grid-like or honeycomb structure having openings of 6 mm in diameter and 1.4 mm in wall thickness extending throughout the structure parallel to the axial direction. The structure was heated from room temperatures to 100° C., and dried at the temperature, and then calcined at 500° C. for three hours, thereby to prepare a honeycomb structure supporting thereon tungsten oxide.

The honeycomb structure was then immersed in an aqueous solution containing 100 g of ammonium metavanadate and 25 g of oxalic acid, dried at 100° C. for 12 hours, and calcined at 500° C. for three hours, to produce a denitrizing catalyst supporting tungsten oxides and vanadium oxides thereon.

The catalyst was placed in a reactor. A mixture gas composed of 200 ppm of nitrogen oxides, 200 ppm of ammonia, 10% by volume of water vapor, 2% by weight of oxygen, 12% by volume of carbon dioxide, 800 ppm of sulfur dioxide and the balance nitrogen was passed through the catalyst in the reactor at a space velocity of 10675 $hr^{-1}$ at a temperature of 380° C., to catalytically remove the nitrogen oxides (NOx) from the mixture gas. The NOx removal rate and sulfur dioxide ($SO_2$) oxidation rate are shown in the Tables 1 and 2, wherein NOx removal rate (%) is defined as: [(NOx concentration at inlet of the reactor—NOx concentration at outlet of the reactor)/NOx concentration at inlet of the reactor]×100; and $SO_2$ oxidation rate (%) is defined as [($SO_2$ concentration at inlet of the reactor — $SO_2$ concentration at outlet of the reactor)/$SO_2$ concentration at inlet of the reactor]×100.

Meanwhile, the honeycomb catalyst structure was cut to a body of 150 mm × 150 mm in length and breadth and 100 mm in axial length, and the axial compression strength was measured with an Amsler compression strength testing machine. The results are also shown in the Tables 1 and 2.

TABLE 1

| | $H_2SO_4/TiCl_4$ (molar ratio) | Stirring Temperature[1] (°C.) | Reaction Temperature[2] (°C.) | Specific Surface Area ($m^2/g$) Calcined at 500° C. | Specific Surface Area ($m^2/g$) Calcined at 600° C. | NOx Removal Rate (%) | $SO_2$ Oxidation Rate (%) | Compression Strength ($kg/cm^2$) |
|---|---|---|---|---|---|---|---|---|
| Example 1 | 0.5 | 70 | 70 | 81 | 35 | 79.3 | 0.23 | 85 |
| Example 2 | 1.0 | 70 | 70 | 96 | 42 | 80.2 | 0.23 | 79 |
| Example 3 | 3.0 | 70 | 70 | 97 | 48 | 79.9 | 0.22 | 81 |
| Reference 1 | 0.25 | 70 | NT | 31 | 21 | 63.2 | 0.19 | 93 |
| Example 4 | 0.5 | 70 | NT | 61 | 36 | 73.9 | 0.20 | 85 |
| Example 5 | 1.0 | 70 | NT | 72 | 46 | 73.8 | 0.21 | 88 |
| Example 6 | 2.0 | 70 | NT | 75 | 48 | 74.2 | 0.21 | 86 |
| Example 7 | 3.0 | 70 | NT | 78 | 48 | 73.8 | 0.22 | 85 |
| Example 8 | 0.5 | NT | NT | 62 | 33 | 73.6 | 0.21 | 88 |
| Example 9 | 1.0 | NT | NT | 81 | 39 | 74.3 | 0.22 | 83 |
| Example 10 | 3.0 | NT | NT | 92 | 46 | 80.1 | 0.04 | 79 |

Notes:
[1] Temperatures at which titanium tetrachloride solutions were stirred after the addition of sulfuric acid thereto.
[2] Temperatures at which ammonia water was added dropwise to titanium tetrachloride solutions after the addition of sulfuric acid thereto and the dilution with water.
NT: normal temperature.

TABLE 2

| | $TiCl_4$ Concentration (moles/l) | Reaction Temperature[1] (°C.) | Addition Rate of $NH_3$ water (l./min.) | Addition Time of $NH_3$ water (min.) | Specific Surface Area ($m^2/g$) Calcined at 500° C. | Specific Surface Area ($m^2/g$) Calcined at 600° C. | NOx Removal Rate (%) | $SO_2$ Oxidation Rate (%) | Compression Strength ($kg/cm^2$) |
|---|---|---|---|---|---|---|---|---|---|
| Example 11 | 0.63 | 70 | 6.5 | 60 | 107 | 53 | 81.2 | 0.24 | 81 |
| Example 12 | 0.63 | 70 | 13 | 30 | 44 | 6 | 63.6 | 0.18 | 89 |
| Example 13 | 0.63 | 70 | 4.3 | 90 | 112 | 63 | 81.8 | 0.25 | 77 |
| Example 14 | 0.63 | 70 | 3.3 | 120 | 121 | 78 | 82.6 | 0.24 | 76 |
| Example 15 | 1.25 | 70 | 3.3 | 60 | 52 | 28 | 68.1 | 0.19 | 89 |
| Example 16 | 0.63 | 50 | 6.5 | 60 | 99 | 56 | 80.6 | 0.23 | 81 |
| Example 17 | 0.63 | 50 | 3.3 | 60 | 117 | 62 | 81.1 | 0.23 | 82 |
| Example 18 | 0.40 | 50 | 6.5 | 60 | 48 | 26 | 62.9 | 0.19 | 92 |
| Example 19 | 0.63 | 90 | 6.5 | 60 | 105 | 56 | 81.1 | 0.23 | 83 |
| Example 20 | 0.63 | 90 | 13 | 30 | 96 | 48 | 80.8 | 0.22 | 83 |
| Example 21 | 0.63 | 90 | 3.3 | 120 | 118 | 76 | 82.3 | 0.24 | 76 |
| Example 22 | 1.25 | 90 | 6.5 | 60 | 92 | 48 | 80.1 | 0.22 | 88 |
| Example 23 | 1.57 | 90 | 6.5 | 60 | 86 | 75 | 79.9 | 0.22 | 80 |
| Example 24 | 0.63 | BP | 6.5 | 60 | 107 | 56 | 81.2 | 0.22 | 82 |
| Example 25 | 0.63 | BP | 13 | 30 | 98 | 53 | 81.3 | 0.22 | 79 |
| Example 26 | 0.63 | BP | 3.3 | 120 | 117 | 75 | 82.2 | 0.25 | 78 |
| Example 27 | 2.09 | BP | 6.5 | 60 | 98 | 52 | 80.8 | 0.23 | 82 |
| Example 28 | 2.5 | BP | 6.5 | 60 | 76 | 45 | 77.1 | 0.20 | 86 |
| Reference 2 | 0.63 | BP | Not added | (180)[2] | 48 | 20 | 63.9 | 0.19 | 89 |
| Reference 3 | 0.63 | NT | 6.5 | 60 | 59 | 4 | 62.8 | 0.19 | 87 |
| Reference 4 | 0.63 | NT | 13 | 30 | 48 | 8 | 63.1 | 0.18 | 85 |
| Reference 5 | 0.63 | NT | 3.3 | 120 | 56 | 3 | 63.3 | 0.20 | 88 |

TABLE 2-continued

| | TiCl₄ Concentration (moles/l) | Reaction Temperature[1] (°C.) | Addition Rate of NH₃ water (l./min.) | Addition Time of NH₃ water (min.) | Specific Surface Area (m²/g) Calcined at | | NOx Removal Rate (%) | SO₂ Oxidation Rate (%) | Compression Strength (kg/cm²) |
|---|---|---|---|---|---|---|---|---|---|
| | | | | | 500° C. | 600° C. | | | |
| Reference 6[3] | | | | | 92 | 63 | 69.9 | 0.30 | 52 |
| Reference 7[4] | | | | | 72 | 38 | 70.8 | 0.22 | 61 |

Notes:
[1]Temperatures at which ammonia water was added dropwise to titanium tetrachloride solutions. The ammonia water used was 25% by weight in concentration.
BP: near boiling temperatures;
NT: normal temperature
[2]Stirring time.
[3]Titanium tetrachloride solutions containing finely divided amorphous silica was neutralization-decomposed.
[4]Metatitanic acid obtained by thermal hydrolysis of titanium sulfate was calcined.

What is claimed is:

1. A method for producing titanium oxides for use as a catalyst carrier or a molded catalyst which comprises: adding a solution of an alkali at a rate of not more than about 0.05 moles/l per mole of titanium tetrachloride to an aqueous solution of titanium tetrachloride having a concentration of not more than 0.8 mole/l at a temperature of 50°-70° C., to thereby substantially thermally hydrolyze the titanium tetrachloride to produce titanium hydroxide; and then drying and calcining the titanium hydroxide at a temperature of 300°-700° C.

2. A method of producing titanium oxides for use as a catalyst carrier or a molded catalyst which comprises: adding a solution of an alkali at a rate of not more than about 0.05 moles/l per mole of titanium tetrachloride to an aqueous solution of titanium tetrachloride having a concentration of not more than 1.2 mole/l at a temperature of 70°-80° C., to thereby substantially thermally hydrolyze the titanium tetrachloride to produce titanium hydroxide; and then drying and calcining the titanium hydroxide at a temperature of 300°-700° C.

3. A method of producing titanium oxides for use as a catalyst carrier or a molded catalyst which comprises: adding a solution of an alkali at a rate of not more than about 0.05 moles/l per mole of titanium tetrachloride to an aqueous solution of titanium tetrachloride having a concentration of not more than 1.6 mole/l at a temperature of 80°-90° C., to thereby substantially thermally hydrolyze the titanium tetrachloride to produce titanium hydroxide; and then drying and calcining the titanium hydroxide at a temperature of 300°-700° C.

4. A method of producing titanium oxides for use as a catalyst carrier or a molded catalyst which comprises: forming a reaction mixture by adding a solution of an alkali at a rate of not more than about 0.10 moles/l per mole of titanium tetrachloride to an aqueous solution of titanium tetrachloride having a concentration of not more than 2.5 mole/l at a temperature near the boiling temperature of the reaction mixture, to thereby substantially thermally hydrolyze the titanium tetrachloride to produce titanium hydroxide; and then drying and calcining the titanium hydroxide at a temperature of 300°-700° C.

* * * * *